(12) United States Patent
VanBlon et al.

(10) Patent No.: US 11,056,898 B2
(45) Date of Patent: Jul. 6, 2021

(54) SYSTEMS AND METHODS TO DETERMINE TIME AT WHICH BATTERY IS TO BE CHARGED

(71) Applicant: Lenovo (Singapore) Pte. Ltd., Singapore (SG)

(72) Inventors: Russell Speight VanBlon, Raleigh, NC (US); Nathan J. Peterson, Oxford, NC (US); John Carl Mese, Cary, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 73 days.

(21) Appl. No.: 16/249,643

(22) Filed: Jan. 16, 2019

(65) Prior Publication Data
US 2019/0148960 A1 May 16, 2019

Related U.S. Application Data

(62) Division of application No. 15/163,962, filed on May 25, 2016, now Pat. No. 10,283,985.

(51) Int. Cl.
*H02J 7/00* (2006.01)
*G06F 1/26* (2006.01)
*G06F 1/3212* (2019.01)
*G06F 16/23* (2019.01)

(52) U.S. Cl.
CPC ........... *H02J 7/0047* (2013.01); *G06F 1/266* (2013.01); *G06F 1/3212* (2013.01); *G06F 16/2358* (2019.01); *Y02D 10/00* (2018.01)

(58) Field of Classification Search
CPC ...... H02J 7/0047; G06F 1/3212; G06F 1/266; Y02D 10/174

USPC ........................................................ 320/128
See application file for complete search history.

(56) References Cited

U.S. PATENT DOCUMENTS

| | | | |
|---|---|---|---|
| 6,160,490 A | 12/2000 | Pace et al. | |
| 7,191,077 B2 | 3/2007 | Mese et al. | |
| 8,380,999 B1 | 2/2013 | Robison et al. | |
| 2001/0035732 A1 | 11/2001 | Sakakibara | |
| 2004/0130295 A1* | 7/2004 | Kim | H02J 7/0068 320/132 |
| 2004/0199297 A1 | 10/2004 | Schaper et al. | |

(Continued)

FOREIGN PATENT DOCUMENTS

KR 20150019295 2/2015

OTHER PUBLICATIONS

Russell Speight VanBlon, Nathan J. Peterson, John Carl Mese, Arnold S. Weksler, "Systems and Methods to Determine Time at Which Battery is to be Charged", related co-pending U.S. Appl. No. 16/249,637, filed Jan. 16, 2019.

(Continued)

*Primary Examiner* — Zixuan Zhou
(74) *Attorney, Agent, or Firm* — John M. Rogitz; John L. Rogitz

(57) ABSTRACT

In one aspect, a device includes a processor, a battery accessible to the processor and that powers the processor, and storage accessible to the processor. The storage bears instructions executable by the processor to predict a discharge amount of the battery that is to occur within a predefined time and, based on the prediction, determine a frequency at which the battery is to be charged.

20 Claims, 6 Drawing Sheets

(56) References Cited

U.S. PATENT DOCUMENTS

| | | |
|---|---|---|
| 2004/0225333 A1 | 11/2004 | Greatbatch et al. |
| 2007/0057228 A1 | 3/2007 | Huang et al. |
| 2007/0188134 A1 | 8/2007 | Hussain et al. |
| 2007/0279004 A1* | 12/2007 | Wang .................... H02J 7/0068 320/128 |
| 2009/0024863 A1 | 1/2009 | Karstens |
| 2009/0085528 A1 | 4/2009 | Yamada |
| 2009/0156268 A1 | 6/2009 | Kim et al. |
| 2009/0273318 A1 | 11/2009 | Rondoni et al. |
| 2010/0060232 A1 | 3/2010 | Boyles et al. |
| 2010/0085017 A1 | 4/2010 | Heeringa et al. |
| 2010/0123436 A1 | 5/2010 | Herrod et al. |
| 2010/0217466 A1 | 8/2010 | Ichikawa |
| 2011/0018679 A1 | 1/2011 | Davis et al. |
| 2011/0057603 A1 | 3/2011 | Marty et al. |
| 2011/0143777 A1 | 6/2011 | Kim et al. |
| 2011/0195303 A1 | 8/2011 | Chang et al. |
| 2011/0313613 A1 | 12/2011 | Kawahara et al. |
| 2012/0098488 A1 | 4/2012 | Ichikawa |
| 2012/0299554 A1 | 11/2012 | Kruglick |
| 2012/0324578 A1* | 12/2012 | Seinfeld ............ H04W 52/0264 726/24 |
| 2014/0002025 A1 | 1/2014 | Yamamoto et al. |
| 2014/0025322 A1 | 1/2014 | Yang et al. |
| 2014/0028264 A1 | 1/2014 | Taniyama et al. |
| 2014/0195826 A1* | 7/2014 | Wojcik ................. H05K 5/0086 713/300 |
| 2015/0008879 A1 | 1/2015 | Schneider et al. |
| 2015/0048803 A1 | 2/2015 | Noh et al. |
| 2015/0084778 A1 | 3/2015 | Mittal et al. |
| 2015/0200554 A1* | 7/2015 | Marks .................... H02J 50/10 320/108 |
| 2015/0338469 A1* | 11/2015 | Lee ........................ G01R 31/382 324/427 |
| 2016/0062429 A1* | 3/2016 | Cudak .................... G06F 1/263 713/300 |
| 2016/0276865 A1 | 9/2016 | Pike et al. |
| 2017/0086731 A1 | 3/2017 | Raymann et al. |

OTHER PUBLICATIONS

Russell Speight VanBlon, Nathan J. Peterson, John Carl Mese, Arnold S. Weksler, "Systems and Methods to Determine Time at Which Battery is to be Charged", related co-pending U.S. Appl. No. 16/249,652, filed Jan. 16, 2019.

Vanblon et al.,"Systems and Methods to Determine Time at Which Battery is to be Charged", Applicant's response to Non-Final Office Action filed May 12, 2020.

Vanblon et al.,"Systems and Methods to Determine Time at Which Battery is to be Charged", Non-Final Office Action dated Apr. 2, 2020.

Vanblon et al.,"Systems and Methods to Determine Time at Which Battery is to be Charged", related U.S. Appl. No. 16/249,652, Applicant's response to Final Office Action filed Dec. 23, 2020.

Vanblon et al.,"Systems and Methods to Determine Time at Which Battery is to be Charged", related U.S. Appl. No. 16/249,652, Final Office Action dated Dec. 16, 2020.

Vanblon et al.,"Systems and Methods to Determine Time at Which Battery is to be Charged", related U.S. Appl. No. 16/249,652, Applicant's response to Non-Final Office Action filed Sep. 18, 2020.

Vanblon et al.,"Systems and Methods to Determine Time at Which Battery is to be Charged", related U.S. Appl. No. 16/249,652, Non-Final Office Action dated Jul. 10, 2020.

* cited by examiner

SYSTEMS AND METHODS TO DETERMINE TIME AT WHICH BATTERY IS TO BE CHARGED

FIELD

The present application relates generally to systems and methods to determine a time at which a battery is to be charged.

BACKGROUND

As recognized herein, some smart devices entering the market have the ability to execute various tasks for multiple days on a single battery charge. As also recognized herein, with the necessity of daily charging not always being required for these devices, some users may forget to charge their device when charging is needed. This can lead to undesirable consequences, such as the inability of the use the device when he or she may wish to do so or the user having to restrict his or her use of the device to conserve battery power.

SUMMARY

Accordingly, in one aspect a device includes a processor, a battery accessible to the processor and that powers the processor, and storage accessible to the processor. The storage bears instructions executable by the processor to predict a discharge amount of the battery that is to occur within a predefined time and, based on the prediction, determine a frequency at which the battery is to be charged.

In another aspect, a method includes predicting a discharge amount of a battery that is to occur within a recurring period of time and, based on the predicting, determining at least one time at which the battery is to be charged.

In still another aspect, an apparatus includes a first processor, a network adapter, and storage bearing instructions executable by a second processor for predicting an application to be executed using the second processor and, based on the predicting, determining a first time at which a battery is to be charged. The first processor transfers the instructions to the second processor over a network via the network adapter.

The details of present principles, both as to their structure and operation, can best be understood in reference to the accompanying drawings, in which like reference numerals refer to like parts, and in which:

DETAILED DESCRIPTION

Figure 1:
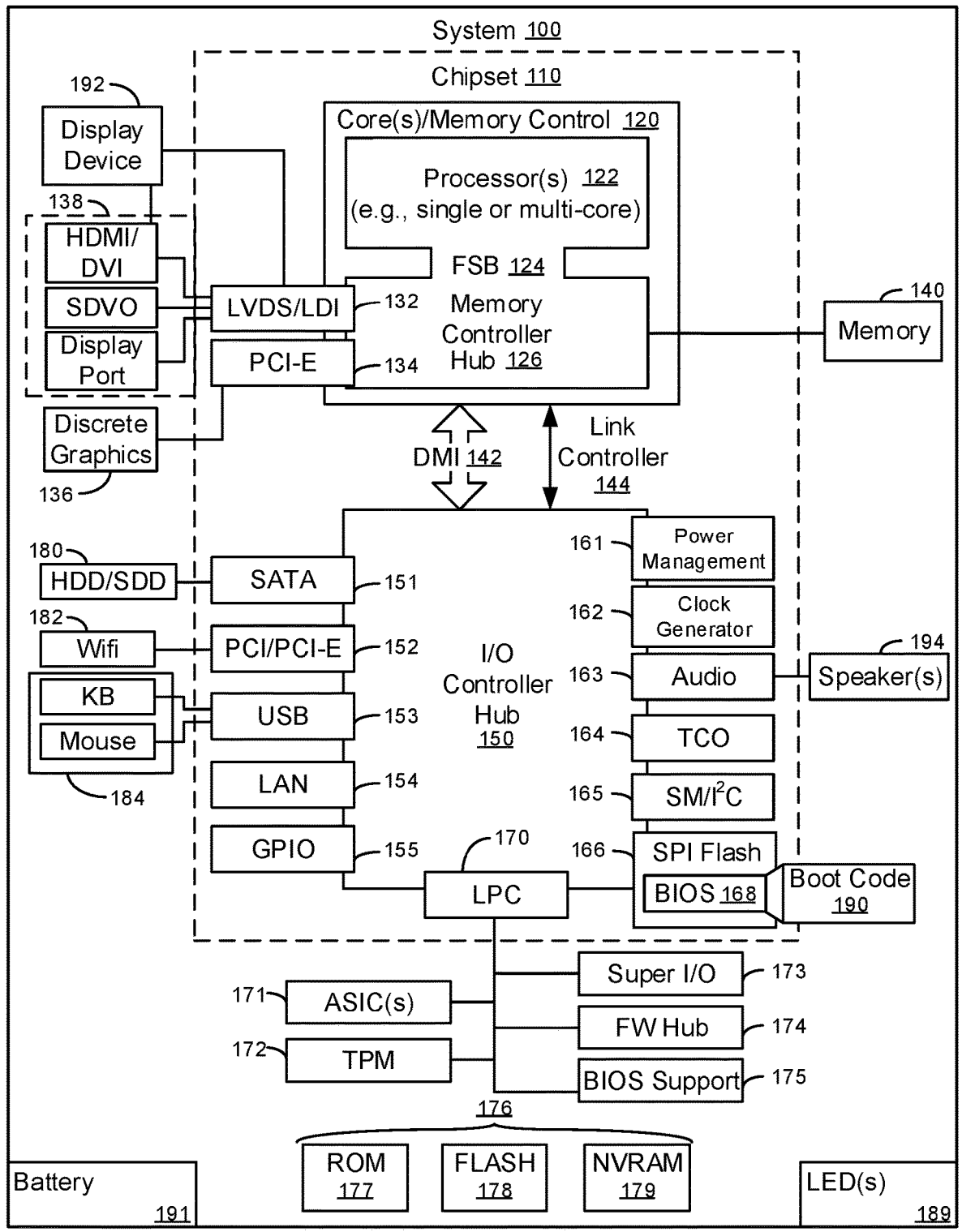
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The INDS 132 may be a so-called LVDS Display. Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-F port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to e TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In some embodiments, the system 100 may include at least one light emitting diode (LED) 189 that is configured to output light in one or more colors, such as an LED that can output light in red, yellow, and green hues. The LED 189 is understood to be accessible to and controllable by the processor(s) 122 to output light. The LED 189 may be positioned on a housing of the system 100 to emit light away from the system 100. For instance, the LED 189 may be positioned on a bezel portion of the display device 192.

Additionally, the system 100 may also include at least one battery pack 191 comprising at least one battery and/or battery cell. The battery pack 191 may be, for instance, in jelly roll format. It may also be in pouch cell format in which the strip(s) of active material are folded. In either case, the battery may be a Lithium ion battery.

Furthermore, the battery pack 191 may be electrically coupled to and power the system 100, and can also be electrically coupled to at least one charge receiver on the system 100 for receiving a charge from a power source via a battery charger to charge one or more battery cells in the pack 191. Thus, the charge receiver itself can include at least one circuit configured for receiving power (e.g., from a wall outlet via a charger) and doing at least one of: providing current to the system 100 to power it, and providing current to the battery pack 191 to charge at least one battery in the pack 191.

The battery pack 191 may also include a battery management unit/system (BMU) that itself may include elements such as a processor, random access memory (RAM), and non-volatile storage bearing instructions executable by the BMU's processor. The battery pack 191 may further include one or more sensors for sensing and measuring things related to the battery pack 191 and/or battery within, such as voltage, age, impedance, state of charge, temperature, current, etc. The sensors may provide input/measurements to the BMU's processor and/or the processor(s) 122.

Additionally, though not shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
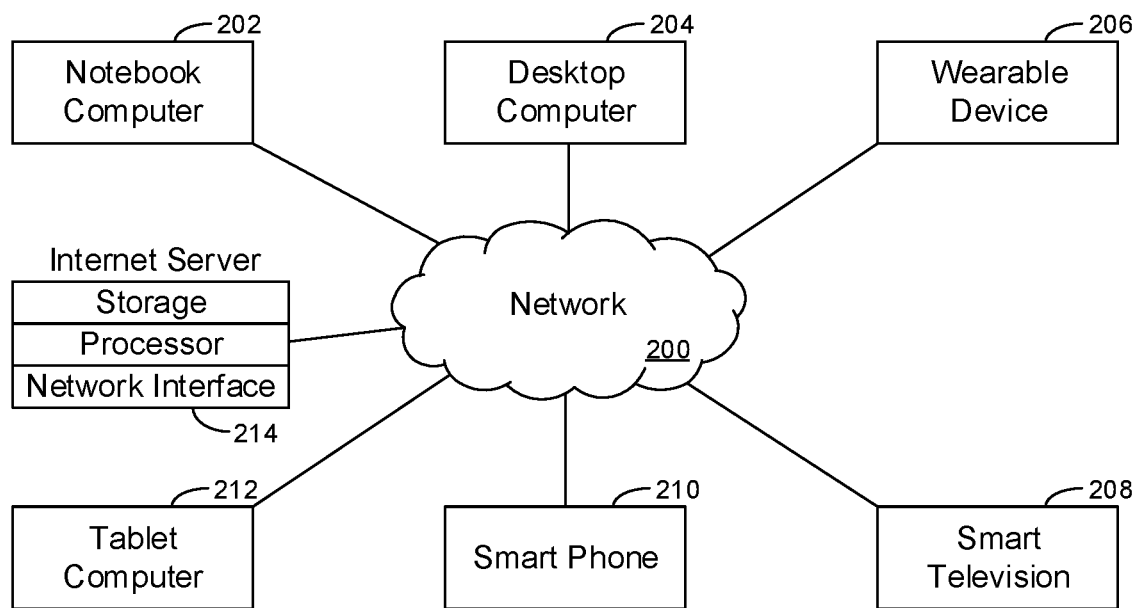
FIG. 2 is an example block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
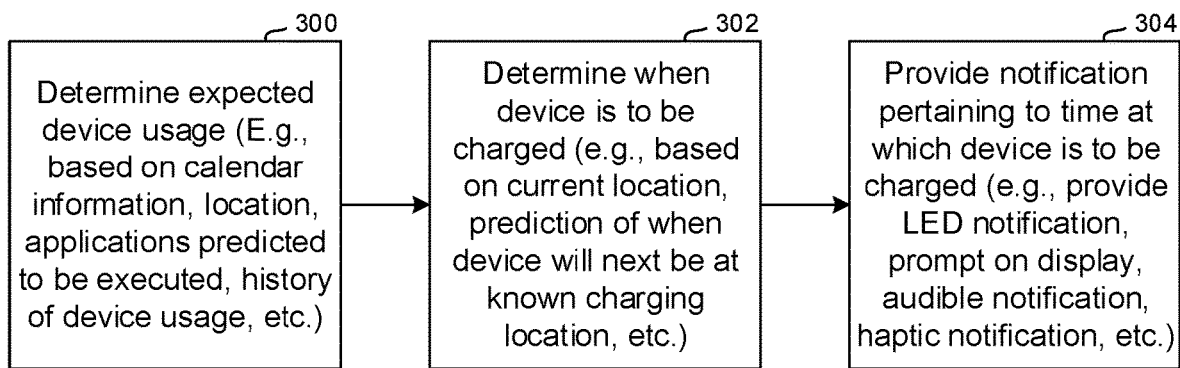
FIGS. 3 and 4 are flow charts of example algorithms in accordance with present principles.

Referring to FIG. 3, it shows example logic that may be executed by a device such as the system 100 (referred to when describing FIG. 3 as the "present device") for determining when a battery on the present device is to be charged based on various factors and for providing a corresponding notification in accordance with present principles. Beginning at block 300, the logic determines an expected device usage for the present device, such as a battery discharge amount. The battery discharge amount may be determined as an amount of voltage reduction the present device's battery is expected to undergo or voltage the battery is expected to lose as it powers the present device during a predetermined time frame, such as may have been indicated by a user or identified as a recurring interval such as a one week time period. A battery discharge amount may also be determined as the difference between a fully charged amount and an amount of battery power that is estimated to remain at the end of the predetermined time frame, such as may be expressed as a percentage of fully charged.

In some embodiments, the battery discharge amount may be determined based on an expected processor usage amount that is estimated to be used during the predetermined time frame, which itself may be determined based on an estimation of a length of time that the processor will be actively used to execute user commands and process user input, as opposed to passive usage for the present device to execute background processes. Also in some embodiments, the battery discharge amount may be determined based on a percentage and/or amount of processor resources estimated to be used relative to a percentage and/or amount of processor resources estimated to be idle, where an average through time of the percentage and/or amount of processor resources estimated to be used may be used.

Estimated random access memory (RAM) consumption may also be used to determine a battery discharge amount through the predetermined time, which may be determined in terms of an amount of RAM to be used during the predetermined time frame and for how long it is to be used. Once processor usage and/or RAM usage are ascertained, an estimate of battery discharge may be determined based on a correlation (e.g., derived from a relational database) of processor or RAM usage to one increment of battery discharge (e.g., a volt increment or an increment of one battery charge percentage point).

Estimated battery discharge amounts, processor usage amounts, and/or RAM usage amounts may be determined based on one or more histories accessible to the present device (that may be established as one or more relational databases) respectively indicating battery discharge amounts, processor usage amounts, and/or RAM usage amounts during various past times. A device undertaking present principles may thus access the one or more histories and identify a past time frame that is similar to the upcoming predetermined time to thus identify an expected battery discharge amount, processor usage amount, and/or RAM usage amount for the predetermined time as, for example, being equivalent (e.g., in total, or equivalent as divided into respective amounts-per-particular time increment) to the respective battery discharge amount, processor usage amount, and/or RAM usage amount indicated in the history for the similar time frame. A similar time frame may be identified based on the upcoming predetermined time and a past time indicated in the history as transpiring over a same day(s) of the week, same day of the month, same day of the year, same time(s) of day, same type of day (e.g., weekday or weekend), and/or same type of time (e.g., morning, afternoon, evening).

A similar time frame may also be identified based on the present device being estimated to be at a particular location during the predetermined time (e.g., as identified based on information in an electronic calendar) that is the same as or proximate to a particular location at which the present device was located and used at a past time as indicated in the history. Still further, a similar time frame may be identified based on a day in the history indicating an activity was engaged in that is the same or similar as an activity to be engaged in during the upcoming predetermined time as may have been identified from an electronic calendar accessible to the present device. For instance, if a user is traveling during a particular day, a previous day on which the user traveled may be identified from an entry in the history, and then the present device may identify, from the identified history entry, an application (such as a GPS or directions-providing application) used and/or a battery usage, processor usage, and/or RAM usage amount that resulted from device use during the previous travel day to thus determine that the same or a similar application, battery usage amount, processor usage amount, or RAM usage amount will be used for the upcoming travel day.

A similar time frame may also be identified based on a day in the history indicating a particular application was executed using the present device (and/or at a particular location) that is the same or similar to an application to be executed during the predetermined time (and/or again at the particular location) as may have been identified from the electronic calendar. For example, the electronic calendar may indicate the particular location in a calendar entry, and the particular application to be used may be identified by using a key word correlation to identify it based on one or more key words for the calendar entry being correlated to use of the particular application).

Still in reference to FIG. 3, from block 300 the logic may proceed to block 302. At block 302 the logic may determine one or more times or time frames during which the present device is to be charged. The logic may do so by determining how long the present device's battery can power the present device based on the expected usage of the present device determined at block 300 and then identifying the time(s) for charging as being at the end of the time the present device's battery can power the present device (or, alternatively, a threshold time before the end).

For instance, an estimated usage amount (or estimated average usage amount over the predetermined time) for a certain type of usage (e.g., processor usage) may be correlated in a data table accessible to the present device to a maximum number of minutes or hours the present device's battery is able to power the present device at the usage amount. The maximum time may then be used to determine, based on a current charge level for the battery, whether the battery has enough power remaining to satisfy the usage amount and last through the maximum minutes or hours and possibly even beyond (such as until a next charging opportunity arises). If the battery has enough power, the time to charge the battery may be identified as being at the end of or after the maximum time would end. If the battery does not have enough power, the time to charge the battery may be identified as an earlier time at which the battery is estimated to no longer be unable to power the device based on the usage amount.

Additionally or alternatively, a usage amount over a particular time increment (such as one minute) may also be identified and correlated to a particular percent discharge of the battery at the usage amount. The present device may then determine when the present device is to be charged by identifying how many percentage points of charge the battery has remaining and how long that charge will last based on the usage amount/time increment correlation to the particular percent discharge, where the time to charge may be identified as the time at which the battery will no longer be able to power the present device or a threshold time before the time the battery will be no longer be able to do so.

Describing the next charging opportunity referenced above, it is to be understood that a next charging opportunity may be determined based on known charging locations for the present device and when the present device is next expected to be at one of the known charging locations. The time at which the present device is next expected to be at one of the known charging locations may be determined based on a device history indicating the present device's typical location at a given time of day, based on electronic calendar information indicating a known charging location, etc. Known charging locations may be identified from a history correlating charging instances of the present device's battery to particular locations, and/or based on user input indicating a particular location as a charging location. In some embodiments, the logic may even determine if the present device is currently at a known charging location, such as may be determined based on coordinates from a GPS transceiver on the present device and identification of those coordinates as being associated with a known charging location.

After block 302, the logic of FIG. 3 may move to block 304 where the logic may provide a notification at the present device pertaining to the time at which the device is to be charged as determined at block 302. For instance, if at block 302 the logic determines that the present device's battery does not have enough charge remaining to power the present device through the predetermined time and until the time of a next charging opportunity, the logic may provide a notification on a display at block 304 indicating as much, as well as indicating that the present device is currently at a known charging location and should be charged before the predetermined time or event begins that is to consume power that would otherwise discharge the battery to the point where it would be unable to continue powering the present device.

In addition to presentation on a display, a notification in accordance with present principles may be presented via activation of a light emitting diode (LED) on the present device in a predetermined color to indicate that the present device should be charged. Additionally or alternatively, the notification may be presented as an audible notification presented through one or more speakers accessible to the present device, and/or as a haptic notification presented as a particular vibration pattern or length using a vibration-generating mechanism on the present device.

Figure 4:
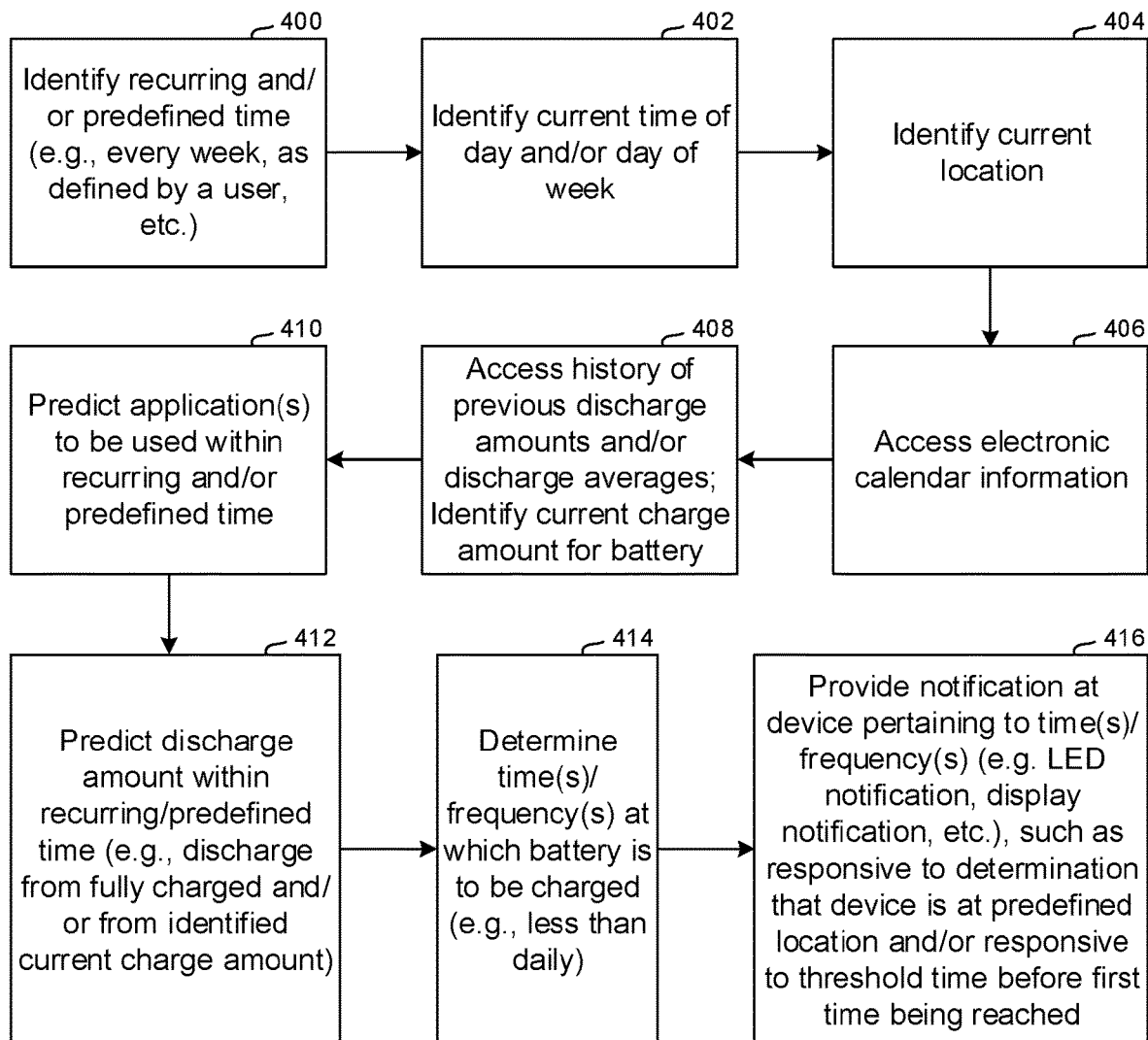

Moving on to the description of FIG. 4, it also shows example logic that may be executed by a device such as the system 100 (referred to when describing FIG. 4 as the "present device") for determining a frequency at which the present device it to have its battery charged. Beginning at block 400, the logic may identify a recurring and/or pre-defined time (and/or intervals thereof), such as a one week time frame from Sunday to Saturday or a one month time frame (e.g., assuming a 30 or 31 day month). The recurring and/or predefined time may be specified by a user and/or may specified by an administrator or manufacturer of the present device.

After block 400 the logic may access and/or identify one or more pieces of information to use for determining the frequency. Thus, from block 400 the logic may move to block 402 where the logic may identify a current time of day and/or current day of the week, such as may be identified from a time application or clock application executing at the present device. The logic may then move to block 404 where the logic may identify a current location of the present device, such as may be identified based on GPS coordinates from a GPS transceiver on the present device. Thereafter, the logic of FIG. 4 may proceed to block 406 where the logic may access electronic calendar information, such as electronic calendar information associated with a particular user of the present device.

From block 406 the logic may then proceed to block 408, where the logic may access one or more histories indicating previous battery discharge amounts and/or discharge averages. In some embodiments, the amounts/averages may be correlated to one or more of particular days or day types, particular times or time types, particular locations or location types, particular activities or activity types, etc. Also at block 408, the logic may identify a current charge amount or level (e.g., voltage) of the battery, as may be identified based on input indicating the current charge amount from the battery's battery management unit (BMU).

After block 408 the logic may move to block 410 where the logic may predict one or more applications to be executed at the present device within during the recurring time (and/or during a particular upcoming interval of the recurring time). The applications to be executed may be predicted based on information in the history accessed at block 408 indicating applications executed at a similar time frame that is also included in the recurring time. The applications to be executed may also be predicted based on information in the electronic calendar accessed at block 406 indicating applications to be used, or indicating key words that may then be correlated to applications to be used.

Still further, the applications to be executed may be predicted based on the current location identified at block 404 and expected locations for the present device during the recurring time (and/or an upcoming interval thereof) as being associated with the applications as may have been derived from a history, where the history correlates the location(s) to applications executed thereat. Additionally or alternatively, the applications to be executed may be predicted based on a history correlating applications used to past times of day and/or particular days that are the same as the current time of day and/or particular day identified at block 402 and that are the same as times of days/days included in the upcoming interval as, etc.

For instance, if based on information in the history it is determined that a particular application is launched and executed at the present device on weekdays from 7:00 a.m. to 9:00 a.m., then at block 410 the logic may predict that during an upcoming weekday within an upcoming interval including 7:00 a.m. to 9:00 a.m. the present device will launch and execute that application. As another example, if based on information in the electronic calendar it is determined that a particular application is will likely be used to participate in a recurring event indicated in the electronic calendar that falls within the recurring time (such as may be identified based on a key word correlation), then at block 410 the logic may predict that during the recurring time the present device will use that application.

As still another example, at block 410 the logic may determine (e.g., based on the history accessed at block 408 and/or calendar information accessed at block 406) that the present device is scheduled to be at a particular location at a particular time during each interval of the recurring time, and that particular applications are executed while the present device at the particular location and/or during the particular time.

Note that in some embodiments at block 410, the logic may determine all applications to be executed within the upcoming interval. E.g., if the recurring time is one week from Sunday to Saturday, the present device may access the history(s) to identify all applications used in at least a threshold number of past intervals of the recurring time from Sunday to Saturday (and even how much battery power they respectively consumed during those past recurring times as identified from a history storing BMU input pertaining to battery power consumption). Based on identifying all applications used in at least the threshold number of past intervals, the present device may then predict that those applications are going to be used during an upcoming interval from Sunday to Saturday.

From block 410 the logic of FIG. 4 may move to block 412, where the logic may predict a discharge amount that the present device's battery is to undergo within the upcoming interval, such as a discharge amount from fully charged at the beginning of the upcoming interval (where "fully charged" may be the most or highest amount of charge possible for the battery depending on a current state of battery such as age, degradation level, etc.), or a discharge amount from a current charge amount at the beginning of the upcoming interval. The prediction at block 412 may be based on information in the history(s) discussed above indicating how much battery power each application executed within at least one similar recurring time from the past had consumed throughout that past interval.

The prediction at block 412 may also be based on applications predicted to be used during a specific upcoming interval. Those applications may be predicted based on calendar information for upcoming events indicated in the calendar information that are to transpire during the upcoming interval and a determination of which applications may be used during those events as disclosed herein. Additionally, the prediction at block 412 for a particular upcoming interval may be based on device updates that are to occur, as may be determined based on data received from an update-provider indicating an update to the present device should be made, and/or as may be determined based on a schedule accessible to the present device of when certain device updates are to be performed.

From block 412 the logic may move to block 414. At block 414 the logic may determine at least one time and/or frequency at which the present device's battery is to be charged during the recurring time and/or particular upcoming interval, which may be less than daily in some embodiments. Times/frequencies may be determined based on how many times during the recurring time and/or particular upcoming interval the battery will discharge from fully charged to zero charge (or a threshold amount above zero charge as may be specified by the user) as computed based on the discharge amount prediction from block 412.

Each time at which the battery is predicted to reach zero charge from fully charged may then be identified as a time during the recurring time and/or particular upcoming interval at which the battery should be charged and hence a corresponding notification indicating as much be provided at block 416. In some embodiments, if one or more of these times are identified as occurring while a user is predicted to be unavailable to initiate charging (such as based on a history of the user's sleep patterns to determine that the user is unavailable to initiate charging during certain nighttime hours), the time may be moved up to an earlier time during which a charging opportunity is predicted to transpire, such as a threshold time before the user is expected to sleep but while the present device is at a known charging location.

In addition to or in lieu of the foregoing, the length of the recurring time may be divided by the total number of instances that the battery is predicted to reach zero charge from fully charged to thus determine a frequency during the recurring time and/or particular upcoming interval at which the battery is to be charged and hence a corresponding notification indicating as much be provided at block 416. In some embodiments, if one or more of the frequencies are identified as being while a user is predicted to be unavailable to initiate charging, times associated with frequencies may be moved up to earlier times during which a charging opportunity is predicted to transpire and this moved-up, time-based frequency may be provided in a notification at block 416.

As mentioned above, once at block 416 the logic may provide a notification at the present device pertaining to the time and/or frequency determined at block 414. The notification may indicate the time and/or frequency even if it has not been reached yet so that a user knows for future reference, and/or the notification may be provided at the determined time/frequency for charging.

In addition to or in lieu of the foregoing, the notification may be provided responsive to a threshold time (e.g., that may be user-specified) being reached before the determined time and/or frequency at which the battery is to be charged. Furthermore, in some embodiments, the notification may be provided responsive to a determination that the present device is at a known charging location so that the user may charge the present device even if the time/frequency has not yet arrived (which may be useful if the user knows her or she will not be able to charge the present device at the time or where appropriate based on the frequency).

The notification provided at block 416 may be presented via activation of a light emitting diode (LED) on the present device in a predetermined color to indicate that the present device should be charged. Additionally or alternatively, the notification may be presented visually on a display accessible to the present device (such as using text presented on the display, and/or providing an icon indication such as by blinking a battery symbol presented on the display and/or altering a color of presentation of the battery symbol), as an audible notification presented through one or more speakers accessible to the present device, and/or as a haptic notification presented as a particular vibration pattern or length using a vibration-generating mechanism on the present device.

Figure 5:
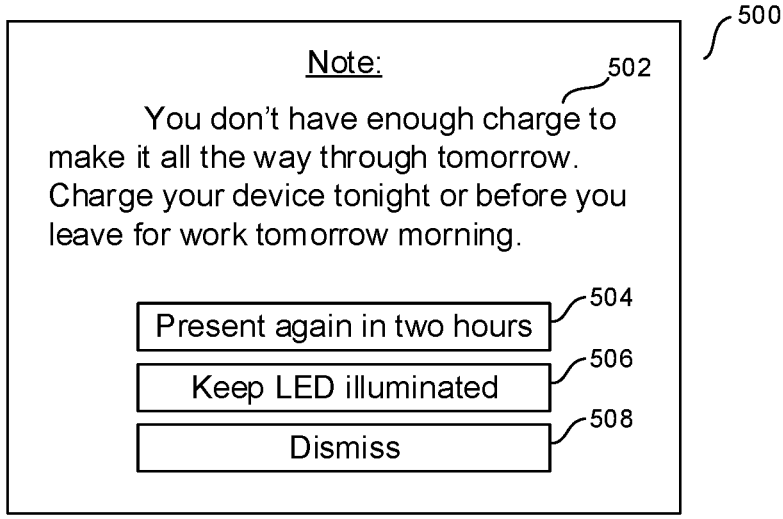
FIGS. 5-7 are example user interfaces (UIs) in accordance with present principles.

FIG. 5 shows an example notification in accordance with present principles presented via a user interface (UI) 500 that itself may be presented on a display accessible to a device undertaking the logic of FIGS. 3 and/or 4. The UI 500 includes an indication 502 that the battery of the user's device does not have enough charge to power the device through tomorrow, and that the battery should be charged tonight or before the user leaves their personal residence (which s a known charging location in this example) for work tomorrow morning.

The UI 500 also includes a selector 504 that is selectable to command the device to dismiss the UI 500 and again present the notification and/or UI 500 in a predetermined number of hours and/or at a later time. The UI 500 also includes a selector 506 that is selectable to command the device to dismiss the UI 500 but to keep an LED on the device illuminated (e.g., in a predetermined color, or to fluctuate between on and off in a predetermined pattern) to continue to indicate that the device should be charged. Still further, the UI 500 may also include a selector 508 to dismiss the UI 500 and, e.g., revert to a home screen for the device.

Figure 6:
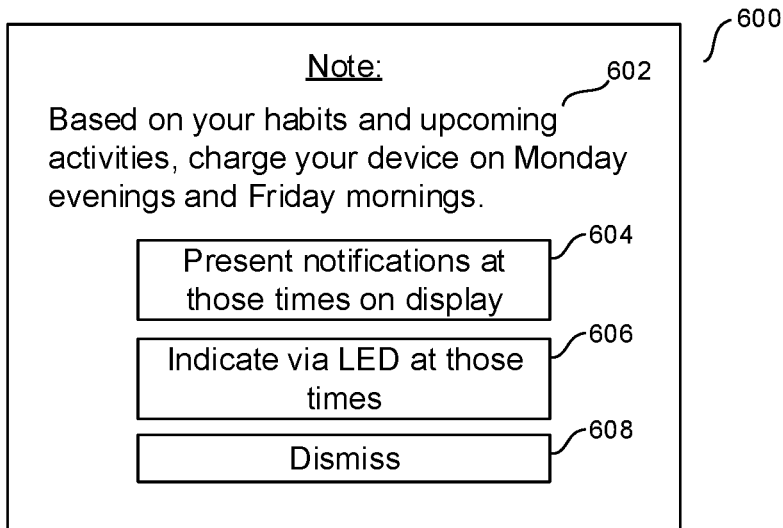

FIG. 6 shows an example notification indicating a charge frequency in accordance with present principles presented via a user interface (UI) 600 that itself may be presented on a display accessible to a device undertaking the logic of FIGS. 3 and/or 4. The UI 600 includes an indication 602 that, based on the user's device usage habits and/or upcoming activities, the device's battery should be charged regularly each Monday evening and Friday morning.

The UI 600 also includes a selector 604 that is selectable to command the device to dismiss the UI 600 and present notifications to charge the device respectively on Monday mornings and Friday evenings (or at a next, upcoming Monday morning and Friday evening). The UI 600 also includes a selector 606 that is selectable to command the device to dismiss the UI 600 and to illuminate an LED on the device on Monday mornings and Friday evenings (or at a next, upcoming Monday morning and Friday evening) to remind the user that the device should be charged during those times. Still further, the UI 600 may also include a selector 608 to dismiss the UI 600 and, e.g., revert to a home screen for the device.

Figure 7:
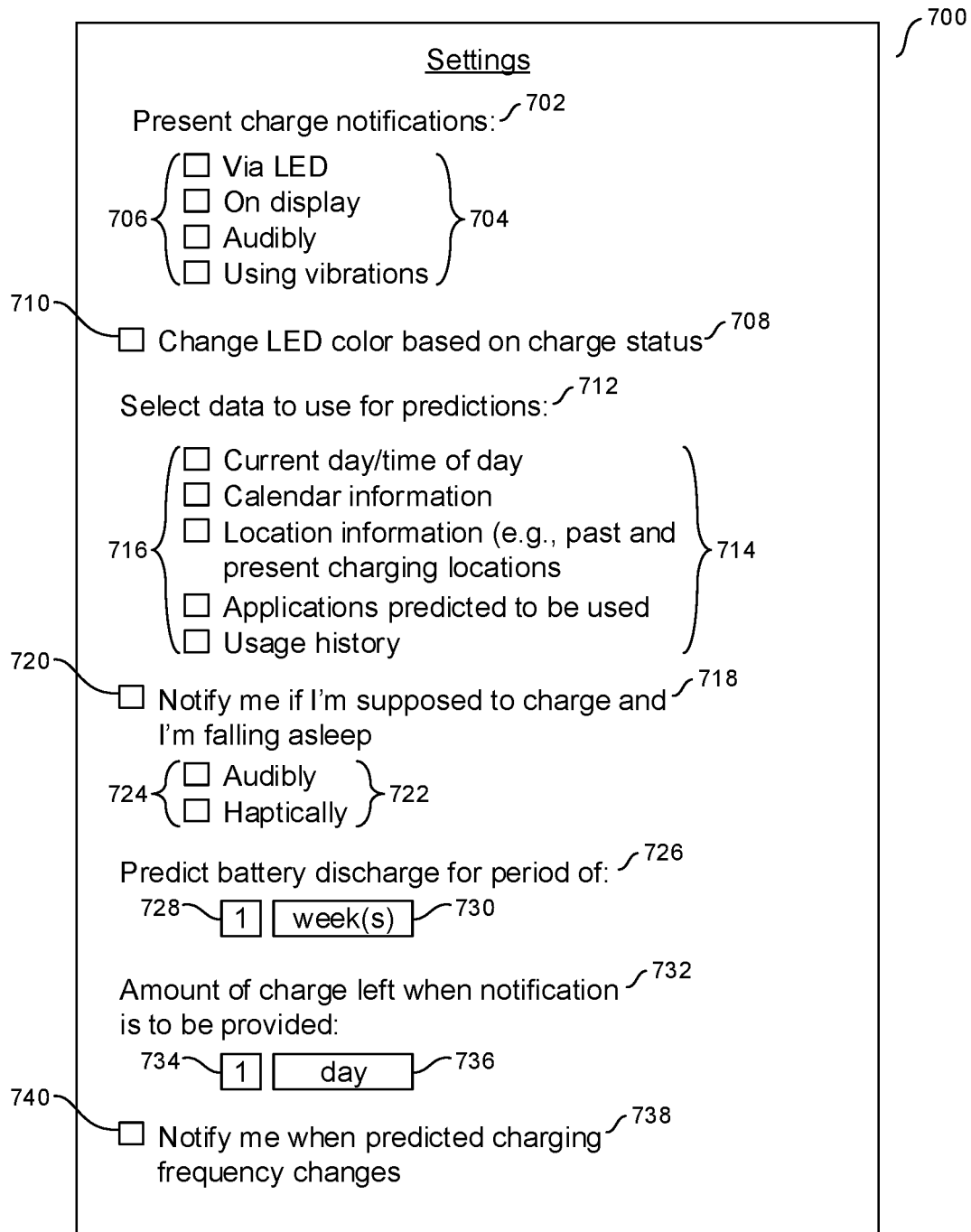

Now in reference to FIG. 7, it shows an example settings UI 700 that may be presented on a display for configuring settings of a device undertaking present principles. The UI 700 may include a first setting 702 for a user to select one or more means 704 of providing notifications related to charging in accordance with present principles. As may be appreciated from FIG. 7, the means 704 include via an LED on the device, on a display, audibly, and using vibrations. Each of the means 704 may be selected to enable that respective means 704 using a respective check box 706 adjacent thereto, and more than one means 704 may be selected at any given time.

The UI 700 may also include an option 708 selectable using check box 710 to enable illumination of an LED on the device to indicate a status of charge of the device's battery so that the color of the LED changes from green (for fully charged or "charge good") to yellow (for half charged, mid-range charge, or "charge okay") to red (for low charge or charge needed).

Also shown in FIG. 7 is a setting 712 to select one or more types of data 714 to use to make predictions in accordance with present principles, such as predictions of applications to be used, predictions of battery power to be consumed, predictions of discharge amounts within recurring time periods, etc. The types of data 714 are respectively selectable using the check boxes 716 shown adjacent to each type of data 714. As may be appreciated from FIG. 7, example types of data 714 may include current day and/or time of day, electronic calendar information, location information (including, for instance, known charging locations visited in the past and ones at which the device is currently at), applications predicted to be used, and device usage history information.

The UI 700 may also include an option 718 that is enableable using check box 720 to present notifications to charge the device's battery in accordance with present principles responsive to a determination that the device is to be charged at or within a certain time and that the user is falling asleep or is sleeping during that time. Thus, it is to be understood that this determination may be based at least in part on input from a sleep sensor engaged with the user to determine when the user is falling asleep or is already asleep. In any case, one or more options 722 selectable using respective check boxes 724 may be selected to enable notifications to be presented via respective means, such as audibly and haptically, to thus awaken and alert the user to charge the device.

The UI 700 shown in FIG. 7 may also include an option 726 for a user to establish a recurring time period for use in accordance with present principles by providing input to a number entry box 728 to enter a number and providing input to increment entry box 730 to enter a time increment associated with the number. In the example shown, input has been provided by a user to establish a recurring time of one week.

The UI 700 may also include an option 732 for a user to establish a time at which a notification is to be provided based on the device's battery having only a certain time-based amount of charge left. The time-based amount of charge may be predicted based on device usage patterns and identified upcoming events in accordance with present principles. In the example shown, input has been provided to number entry box 734 and time increment entry box 736 to establish the time-based amount of charge at which a notification should be provided as when one day of charge remains before the battery is predicted to run out of voltage to power the device save subsequently receiving a charge.

In some embodiments, the UI 700 may also include an option 738 enableable using check box 740 for the device to provide a notification when a predicted charging frequency changes for a given recurring time period, such as a period specified using option 726. For instance, if the recurring time period is one week and the predicted charging frequency is once a week on Tuesday nights, but in two most-recent previous intervals the device's usage increased and hence the device has been predicted to need a charge more than once a week on Tuesday nights, a new charging frequency that is determined may be provided via a notification if option 738 is enabled.

It may now be appreciated that present principles provide for determining when a device needs to be charged based on, for example, a next day's expected usage. If there is enough power to last through the next day, the device may determine that there is no need to charge its battery. If the device determines that a charge should be received to power the device through the next day, the device may notify the user. The notification may be displayed close to the user's bed time. In some embodiments, the notification may be a "soft notification" in the form of a color and/or status indicator using an LED so the user is aware he or she should charge the device. Thus, a user is able to wear and use the device as much as possible, while being made aware (e.g., via the soft notification) that the device should be charged. Furthermore, in some embodiments, if it is detected that the user begins to fall asleep while a charging should be performed, an audible or haptic notification may be provided, and/or another type of notification described herein may be provided.

An expected device usage may be determined based on calendar events, device location, and historical device usage data. For example, if the device determines that the user is going on a trip the next day and will use the GPS feature of their device, the device may determine that it is going to use more power the next day than it otherwise would. As another example, the device may identify that on certain days of the week or month, the user uses more battery-intensive applications than other days, where those certain days may include waiting at a doctor's office, traveling in a car, days the user is at his or her work location and days they are only at their personal residence, days the user travels and days the user does not, days that time is spent reading electronic books using the device, etc. Factors such as the foregoing may be identified and useful for estimating the device's demands placed on it by the user for the next day to determine if charging should be performed the preceding day and a notification be provided during the preceding day.

In some embodiments, a device undertaking present principles may even determine a "max charging cadence", where the device determines the number of days it can operate on a single charge (without an intervening charge therebetween) based on one or more sets of data. After predicted usage is determined for that device (or even as input by the user, if the user would like to indicate how much he or she is planning on using the device in the future) based on past usage data for that device and/or for another device associated with the use a previous device the user no longer owns, another device the user currently owns, etc.), the device may provide a notification indicating, e.g., "Charge me on Friday nights" to give the user a "worst case scenario" for when is the last period of time that the user should charge the battery or risk there not being enough power left in the battery to power the device. The user may thus be provided with an indication of a regularity/frequency of charging the device even if that regularity is not daily.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein.

What is claimed is:

1. A device, comprising:
   at least one processor;
   a battery accessible to the at least one processor and that powers the at least one processor; and
   storage accessible to the at least one processor and comprising instructions executable by the at least one processor to:
   predict an application that is to be executed at the device within the next day and determine whether the battery has enough power to last through the next day based at least in part on the application predicted to be executed;
   based on the prediction and the determination of whether the battery has enough power to last through the next day, determine a first time in the future at which the battery is to be charged; and
   provide a notification at the device that indicates that the battery is to be charged at least by the first time.

2. The device of claim 1, wherein the instructions are executable by the at least one processor to:
   predict an application to be executed within a threshold time of a current time; and
   based on the prediction of an application to be executed within a threshold time of a current time, determine the first time.

3. The device of claim 1, wherein the prediction is based at least in part on key words identified from an entry in an electronic calendar accessible to the device, the key words correlated to execution of the application at the device within the next day.

4. The device of claim 1, wherein the prediction is based at least in part on identification of a first location at which the device is expected to be in the future and based on the application being executed at the first location during a previous time.

5. The device of claim 1, wherein the application is predicted to be executed in the future at the device based on the application being executed on a recurring basis in the past.

6. The device of claim 1, wherein the determination of the first time in the future is also based on estimated random access memory (RAM) usage at the device in the future.

7. The device of claim 1, comprising a display accessible to the at least one processor, wherein the notification is presented on the display.

8. The device of claim 1, comprising a speaker accessible to the at least one processor, wherein the notification is presented audibly via the speaker.

9. A method, comprising:
predicting an application that is to be executed at a device within the next day and determining whether a battery of the device has enough power to last through the next day based at least in part on the application predicted to be executed;
based on the predicting and the determining of whether the battery has enough power to last through the next day, determining a first time in the future at which the battery is to be charged; and
providing a notification at the device that indicates that the battery is to be charged at least by the first time.

10. The method of claim 9, comprising:
predicting an application to be executed within a threshold time of a current time; and
based on the predicting of an application to be executed within a threshold time of a current time, determining the first time.

11. The method of claim 9, wherein the predicting is based at least in part on key words identified from an entry in an electronic calendar, the key words correlated to execution of the application at the device within the next day.

12. The method of claim 9, wherein the predicting is based at least in part on identification of a first location at which the device is expected to be in the future and based on the application being executed at the first location during a previous time.

13. The method of claim 9, wherein the application is predicted to be executed at the device within the next day based on the application being executed on a recurring basis in the past.

14. The method of claim 9, wherein the determining the first time in the future is also based on estimated random access memory (RAM) usage at the device in the future.

15. An apparatus, comprising:
a first processor;
a network adapter; and
storage comprising instructions executable by a second processor of a device for:
predicting an application that is to be executed at the device within the next day and determining whether a battery of the device has enough power to last through the next day based at least in part on the application predicted to be executed;
based on the predicting and the determining of whether the battery has enough power to last through the next day, determining a first time in the future at which the battery is to be charged; and
providing a notification at the device that indicates that the battery is to be charged at least by the first time;
wherein the first processor transfers the instructions to the device over a network via the network adapter.

16. The apparatus of claim 15, wherein the instructions are executable for:
predicting an application to be executed within a threshold time of a current time; and
based on the predicting of an application to be executed within a threshold time of a current time, determining the first time.

17. The apparatus of claim 15, wherein the predicting is based at least in part on key words identified from an entry in an electronic calendar, the key words correlated to execution of the application at the device within the next day.

18. The apparatus of claim 15, wherein the predicting is based at least in part on identification of a first location at which the device is expected to be in the future and based on the application being executed at the first location during a previous time.

19. The apparatus of claim 15, wherein the application is predicted to be executed at the device within the next day based on the application being executed on a recurring basis in the past.

20. The apparatus of claim 15, wherein the determining the first time in the future is also based on estimated random access memory (RAM) usage at the device in the future.

* * * * *